Patented May 18, 1943

2,319,634

UNITED STATES PATENT OFFICE 2,319,634

SOFTENER FOR SYNTHETIC RUBBER

Doran E. Sauser, Cuyahoga Falls, Ohio, assignor to The B. F. Goodrich Company, New York, N. Y., a corporation of New York No Drawing. Application June 2 1942,
Serial No. 445,481

5 Claims. (Cl. 260—36)

This invention relates to a new class of softeners for synthetic rubber and to improved compositions obtainable by the use of such softeners.

It is well known that butadienes may be polymerized either alone or in the presence of other unsaturated compounds copolymerizable therewith to form polymers resembling natural rubber. It has been found that in order to employ these synthetic rubbers, softeners or plasticizers must be incorporated therein, usually in larger amounts than are ordinarily used in natural rubber compositions. The softening of synthetic rubber has in general presented problems not encountered in the softening of natural rubber due to different behavior on mill rolls, incompatibility of synthetic rubber with certain softening and plasticizing materials commonly employed in natural rubber, and other differences in properties. It has been particularly difficult to find satisfactory softeners for the oil-resisting synthetic rubbers such as copolymers of butadiene and acrylonitrile and plastic polymers of chloroprene, for many softeners are oily materials of the types which these synthetic rubbers resist.

It is the principal object of this invention to provide a new class of softeners which may be employed with synthetic rubbers prepared by the polymerization of butadienes-1,3, and particularly those prepared by the copolymerization of butadiene and acrylonitrile. It is a further object of this invention to provide softeners which aid in the incorporation of compound ingredients on a roll mill and which aid in the production of vulcanizates having a low durometer hardness, high rebound elasticity, low temperature flexibility and a good tensile strength.

These and other objects are effected by incorporating an aliphatic nitrile containing an open chain of at least ten carbon atoms in a synthetic rubber produced by the polymerization of a butadiene-1,3. As examples of suitable softeners may be mentioned dodecane nitrile, tetradecane nitrile, hexadecane nitrile, octadecane nitrile, 9-octadecene nitrile, etc. These nitriles are conveniently prepared by treating fatty acids with ammonia and dehydrating the products. Since individual fatty acids are relatively difficult to obtain in the pure state, it is ordinarily expedient to employ nitriles prepared from mixtures of fatty acids such as the mixtures obtained from cottonseed oil, palm oil, coconut oil, etc.

These higher aliphatic nitriles may be employed as softeners for any of the synthetic rubbers prepared by the polymerization of a butadiene-1,3, by which is meant butadiene-1,3 and its homologues and analogues which polymerize in essentially the same manner such as isoprene, 2,3-dimethylbutadiene, piperylene, chloroprene, etc., either alone or in admixture with each other and/or mono-olefinic monomers copolymerizable therewith such as styrene, vinyl naphthalene, isobutene, acrylonitrile, alpha-methacrylonitrile, alpha - chloroacrylonitrile, methyl methacrylate, methyl acrylate, alpha-chloro methyl acrylate, vinylidene chloride, methyl isopropenyl ketone, methyl vinyl ether, and other mono-olefinic hydrocarbons, esters, ethers, and ketones. The copolymerization to form a synthetic rubber may be accomplished by any of the well-known methods such as homogeneous polymerization, polymerization in aqueous emulsion, etc.

The softeners of this invention may be incorporated into the synthetic rubber by any desired method as by adding the softener to the monomer prior to or during the polymerization, adding the softener while the synthetic rubber is being worked on a roll mill, masticating a mixture of synthetic rubber and the softener in an internal mixer, or adding the softener to a solution or dispersion of the synthetic rubber.

The amount of softener added will depend upon the properties desired in the softened composition and upon the nature of the synthetic rubber treated. The higher aliphatic nitriles are compatible with even the oil-resisting synthetic rubbers such as copolymers of butadiene and acrylonitrile over a wide range of proportions. Compositions containing an equal amount by weight of softeners and synthetic rubber may be employed, although between 5 and 25 parts and not more than about 50 parts by weight of softeners for each 100 parts of synthetic rubber are generally employed in the manufacture of tires, inner tubes, hose, belts, and similar rubber goods in which the softener is employed mainly to assist in compounding and processing operations rather than to vary the properties of the vulcanizates.

As an example of the use of one of the softeners of this invention, 50 parts by weight of 9-octadecene nitrile were employed as a softener in a composition containing 100 parts by weight of a synthetic rubber prepared by the emulsion copolymerization of 55 parts by weight of butadiene and 45 parts of acrylonitrile, and other ordinary compounding ingredients such as gas black, antioxidant, accelerator, and softeners. The compounded stock had a plasticity of 40.5 as measured by a Dietrich-Karrer plastometer employing a 10 lb. weight at 35° C. A similar composition in which dibutyl phthalate, one of the best and most widely used softeners for this type of synthetic rubber, was employed instead of the 9-octadecene nitrile exhibited a plasticity of only 15.3 under the same conditions. Furthermore, the vulcanizates prepared from the composition softened with 9-octadecene nitrile exhibited an unusually high tensile strength for such a soft synthetic rubber. Excellent softening action is also exhibited by other higher aliphatic nitriles such as a mixture of about 75 parts by weight of adecane nitrile and about 25 parts of hexadecane nitrile.

Although I have herein disclosed a specific embodiment of my invention, I do not intend to limit the invention solely thereto, for many variations and modifications are within the spirit and scope of the invention as defined in the appended claims.

I claim:

1. A composition of matter comprising a synthetic rubber prepared by the polymerization of a butadiene-1,3, and, as a softener therefor, an aliphatic nitrile containing an open chain of at least ten carbon atoms.

2. A composition of matter comprising a copolymer of butadiene-1,3 and a copolymerizable mono-olefinic compound and, as a softener therefor, an aliphatic nitrile containing an open chain of at least ten carbon atoms.

3. A composition of matter comprising a copolymer of butadiene-1,3 and acrylonitrile and, as a softener therefor, an aliphatic nitrile containing an open chain of at least ten carbon atoms.

4. A composition of matter comprising a synthetic rubber prepared by the polymerization of a butadiene-1,3, and, as a softener therefor, 9-octadecene nitrile.

5. A composition of matter comprising a copolymer of butadiene-1,3 and acrylonitrile and, as a softener therefor, 9-octadecene nitrile.

DORAN E. SAUSER.

DISCLAIMER 2,319,634.—*Doran E. Sauser*, Cuyahoga Falls, Ohio. SOFTENER FOR SYNTHETIC RUBBER. Patent dated May 18, 1943. Disclaimer filed October 25, 1944, by the assignee, *The B. F. Goodrich Company*.

Hereby enters this disclaimer to claim 5 of said patent.

[*Official Gazette November 21, 1944.*]